Figure 1:
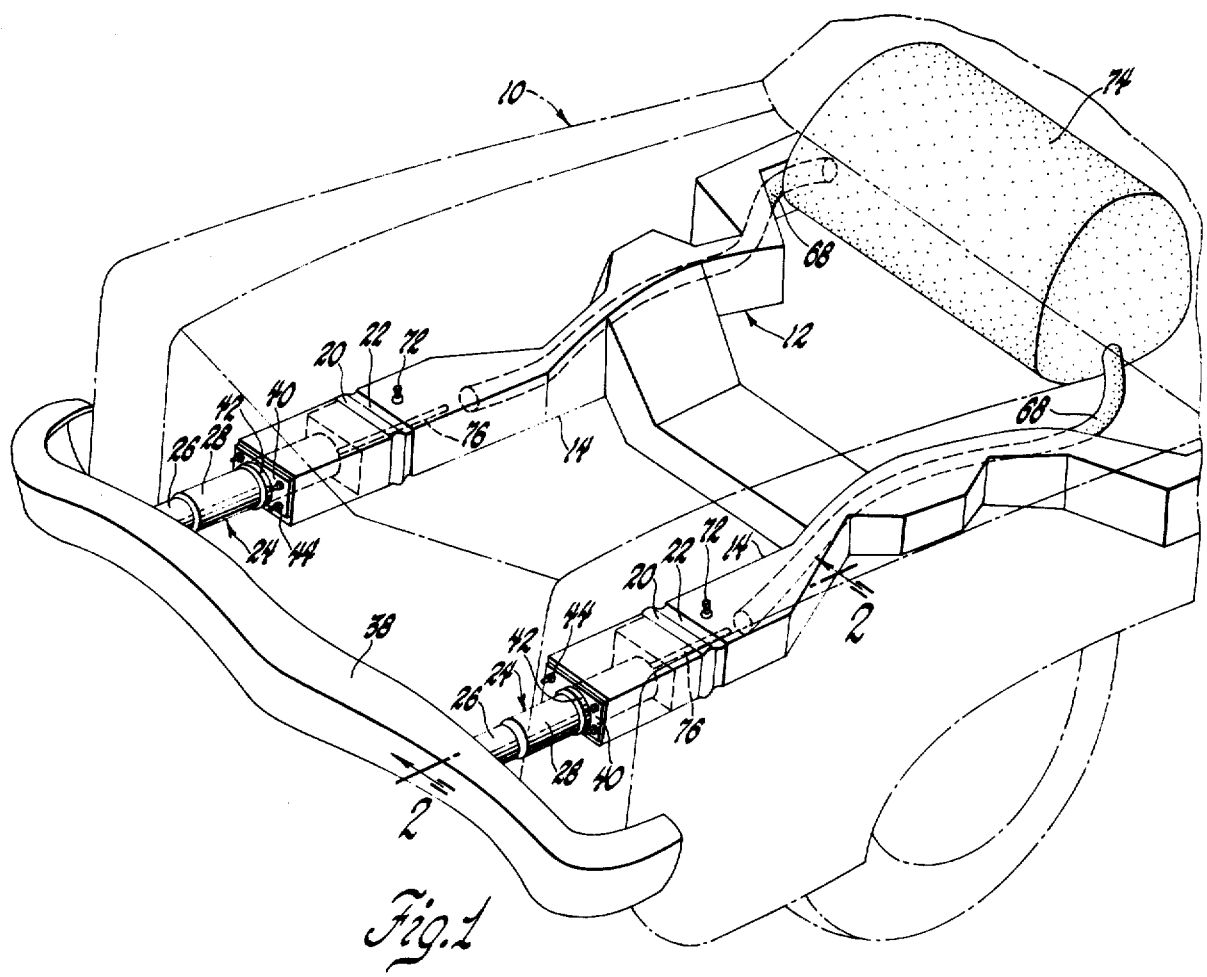

United States Patent

Lindbert et al.

[11] B 3,922,002
[45] Nov. 25, 1975

[54] OCCUPANT RESTRAINT SYSTEM

[75] Inventors: Brook A. Lindbert, Utica; Edward H. Mertz, Birmingham; Wesley L. McCollum, Brighton, all of Mich.

[73] Assignee: General Motors Corporation, Detroit, Mich.

[22] Filed: Nov. 24, 1972

[21] Appl. No.: 309,499

[44] Published under the Trial Voluntary Protest Program on January 28, 1975 as document no. B 309,499.

[52] U.S. Cl. ............... 280/150 AB; 180/91; 293/2; 293/69 R
[51] Int. Cl.² ........................................ B60R 21/08
[58] Field of Search ...... 280/150 AB; 180/82 R, 91, 180/94; 293/1, 2, 60, 63, 69, 70, 73, 85, 89; 188/1 C; 267/116, 136, 139

[56] References Cited
UNITED STATES PATENTS

| | | | |
|---|---|---|---|
| 2,074,469 | 3/1937 | Haynes | 293/63 |
| 2,555,436 | 6/1951 | Druilhet | 188/1 C |
| 3,097,725 | 7/1963 | Peterson | 188/1 C |
| 3,146,014 | 8/1964 | Kroell | 293/70 |
| 3,495,474 | 2/1970 | Nishimura et al. | 180/91 |
| 3,495,675 | 2/1970 | Hass et al. | 180/103 |
| 3,654,412 | 4/1972 | Haruna | 180/91 |
| 3,718,332 | 2/1973 | Jones | 280/150 AB |

*Primary Examiner*—Kenneth H. Betts
*Assistant Examiner*—John P. Silverstrim
*Attorney, Agent, or Firm*—Herbert Furman

[57] ABSTRACT

A vehicle includes a frame having a pair of forward hollow frame rails, each of which has one or more peripheral beads providing for controlled collapse of the frame rails under higher level impact forces to thereby absorb such forces by mechanical deformation. An energy absorbing strut is received within each of the frame rails. Each strut includes inner and outer telescopic members. The inner members are secured to the bumper or impact bar of the vehicle and the outer members are fixed to the frame rails forwardly of the beads. The inner and outer members cooperatively provide a chamber filled with a pressurized fluid medium. A piston on each inner member is movable within the chamber upon telescoping movement of the inner and outer members. A flexible bladder containing pressurized gas is enclosed within each frame rail rearwardly of the energy absorbing strut. The bladder has an outlet closed by a rupturable diaphragm and communicating by means of a passage with an inflatable occupant restraint cushion. The outer member of each strut mounts a piercing rod which is received within the bladder. Lower level impact forces applied to the impact bar are absorbed by the struts upon telescoping movement of the inner members within the outer members and flow of the medium from one side of the pistons to the other. Under higher level impact forces, the struts bottom out and the forward frame rails collapse at the beads thereof to absorb such impact forces by mechanical deformation. During such mechanical deformation, the piercing rods engage and mechanically rupture the diaphragms to permit the pressurized gas within the bladders to flow through the passages to the cushion and inflate the cushion.

4 Claims, 2 Drawing Figures

U.S. Patent  Nov. 25, 1975  3,922,002

OCCUPANT RESTRAINT SYSTEM

This invention relates to occupant restraint systems for vehicles and more particularly to such a system which includes an inflatable occupant restraint inflated from a self-contained source of pressure fluid when impact forces generated by impact of the bumper of the vehicle with an obstacle exceed a predetermined limit.

Occupant restraint systems which include an inflatable occupant restraint, such as a cushion, are well known. Such systems may include a pressure vessel, a gas generator, or a hybrid type source for providing the pressure fluid to inflate the cushion or other restraint. Inertia type sensors, or velocity type sensors, or combinations of such sensors, operated by impact of the vehicle with an obstacle, are known to actuate the pressure fluid source and thereby inflate the restraint. It is also known to actuate the pressure fluid source by a switch operated by deformation of the bumper of the vehicle, or controlled movement of the bumper relative to the chassis under impact conditions. Such controlled movement may mechanically actuate the switch or may actuate a pressure responsive switch by means of the pressure fluid contained within the bumper support system.

In a preferred embodiment of this invention, a pressure fluid source is encapsulated within each of the hollow forward frame rails of the vehicle frame. Each source has an outlet closed by a mechanically rupturable diaphragm and communicating with an inflatable occupant restraint cushion by means of a passage. Each frame rail fixedly mounts an energy absorbing bumper support of the telescoping strut type and generally including inner and outer telescopic members, one being fixed to the frame rail and the other being fixed to the bumper or impact bar. Such an energy absorbing strut functions to absorb energy through the flow of a displaceable fluid medium from one side of a piston to the other side thereof on relative telescopic movement of the members.

When the impact forces received by the impact bar upon engagement thereof with an obstacle fall within a lower level or predetermined first range, the struts absorb the impact forces. Should the impact forces exceed the first range and fall within a second higher level or predetermined range, the struts will bottom out. One or more beads in each forward frame rail then provide for controlled collapse of the forward frame rails to absorb such higher level forces by mechanical deformation. The struts move with the rails as the rails collapse. A piercing rod mounted on each strut is received within the encapsulated fluid source and spaced from the diaphragm controlling the outlet thereof. Upon collapse of the forward frame rails through a predetermined distance, the piercing rods engage and mechanically rupture the diaphragms to release the pressure fluid for flow through the passages to inflate the cushion. Thus this system includes energy absorbing bumper supports for absorbing lower level impact forces received by the bumper, and controlled collapsible or mechanically deformable portions of the vehicle frame for absorbing higher level impact forces received by the frame from the bumper through the bumper supports. The encapsulated pressure fluid source is mechanically released should the impact forces be within the higher level. The mechanically deformable portions of the frame function as a sensor to ensure that the cushion or restraint should be inflated due to the level of impact forces received by the vehicle. The pressure fluid source is self-contained within the frame and the release of the fluid does not require any external source of energy.

One feature of this invention is that it provides an improved occupant restraint system for a vehicle wherein the inflation of an inflatable occupant restraint is controlled by the mechanical deformation of a support means for the impact bar or bumper of the vehicle. Another feature of this invention is that the support means absorbs higher level impact forces and lower level impact forces are absorbed by the displacement of a fluid medium. A further feature of this invention is that the displacement of the fluid medium occurs upon relative telescopic movement of a pair of members through a predetermined distance and the mechanical deformation of the support means occurs when the members have moved through this distance. Yet another feature of this invention is that the inflation of the restraint is accomplished by the rupture of a rupturable diaphragm controlling communication between a source of pressure fluid and the restraint. Yet a further feature of this invention is that the telescopic members function to rupture the diaphragm during the mechanical deformation of the support means.

Figure 2:
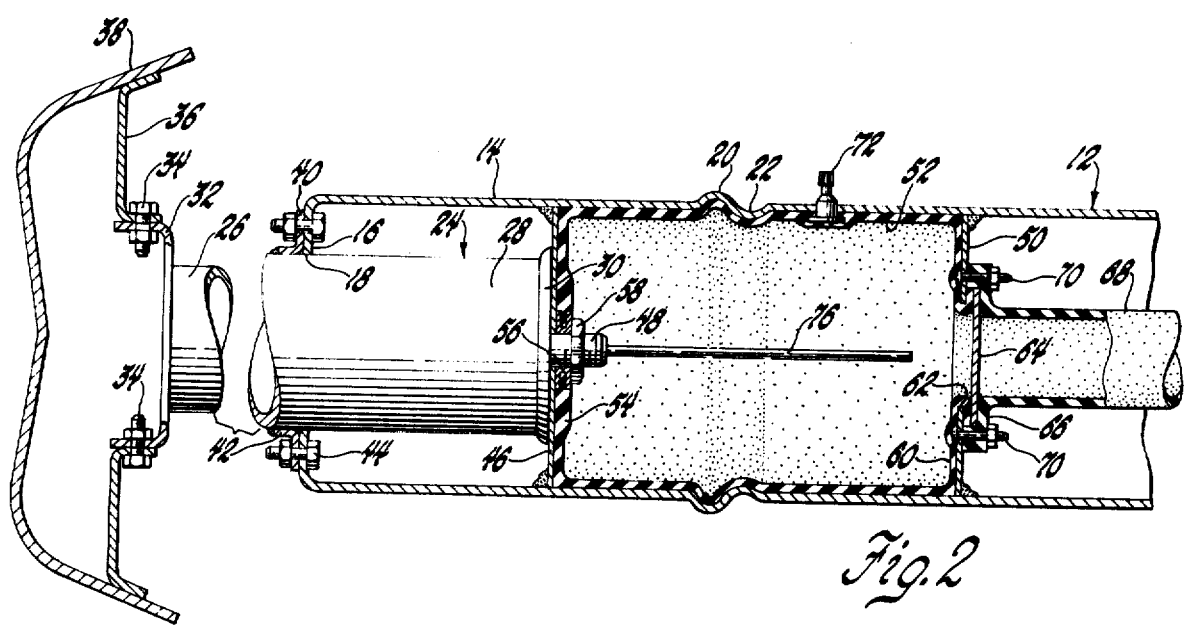

These and other features of the invention will be readily apparent from the following specification and drawings wherein:

FIG. 1 is a partial perspective view of a vehicle embodying an occupant restraint system according to the invention; and FIG. 2 is an enlarged sectional view taken generally along the plane indicated by line 2—2 of FIG. 1.

Referring now particularly to FIG. 1 of the drawing, a vehicle designated generally 10 and being of either the body frame type or the integral body type includes a frame or frame extension 12 having a pair of forward frame rails 14. Both rails are of like structure and, accordingly, only the right-hand one will be described and it will be understood that the left-hand one is of like structure. The frame rail 14 is generally of hollow rectangular cross section. The forward end of the rail 14 is provided with a continuous peripheral flange 16, FIG. 2, which defines a generally circular opening 18 to the interior of the rail. The rail 14 further includes a generally outwardly extending peripheral bead 20 which merges into a generally inwardly extending peripheral bead 22 immediately rearwardly therefrom. The beads 20 and 22 provide for controlled collapse of the rail 14 to absorb the energy of impact forces as will be further described.

An energy absorbing device or strut designated 24 includes an inner cylindrical telescopic member 26 and an outer cylindrical telescopic member 28. The details of the strut 24 are not shown herein since the strut is commercially available and is shown and described in detail in copending application Ser. No. 91,008, Jackson et al., filed Nov. 19, 1970 (now U.S. Pat. No. 3,700,273), "Energy Absorbing Bumper System," and assigned to the assignee of this invention. The device 24 functions to absorb the energy of impact forces by the displacement of a pressurized fluid medium from one side of an apertured piston member to the other side thereof. Briefly, the inner end of the member 26 mounts a centrally apertured piston member. The member 28 mounts a metering rod received within the piston member aperture to provide a variable area orifice. A chamber within the member 28, between one side of the piston member and the inner end wall 30 of the member 28, is filled with a suitable fluid medium, and a chamber within the member 26 to the other side of the piston member is likewise filled with the same medium. The latter chamber is defined within the member 26 by a second piston which is located by gas under pressure within the member 26.

The member 26 further mounts a generally U-shaped bracket 32 which closes the outer end thereof and is bolted at 34 to an inner face plate 36 of the bumper or impact bar 38. A rectangular bracket 40 includes a central circular lateral flange 42 which is welded to the outer surface of the member 28 of strut 24. The bracket 40 is bolted at 44 to the flange 16 around the opening 18 to fixedly secure the strut to the forward terminus or end of the rail 14.

With reference particularly to FIG. 2, an internal wall 46 traverses the rail 14 forwardly of the beads 20 and 22. The wall 46 is welded or otherwise fixedly secured to the rail 14 internally thereof. The wall 30 of member 28 abuts the wall 46 and a rearwardly extending threaded stud 48 of the member 28 extends through a central circular opening in the wall 46. The stud 48 may be formed as part of the metering rod which is secured to the wall 30 and projects within the aperture of the piston member mounted on the inner end of the member 26 as previously mentioned. A second internal centrally apertured wall 50 traverses the rail 14 rearwardly of the beads 20 and 22. Wall 50 is welded to the rail 14 internally thereof. A container or housing 52 of flexible material fits within the frame rail 14 and has an outer wall which conforms to the shape thereof. An apertured forward end wall 54 of the housing abuts the wall 46. The opening of the forward wall 54 is reinforced by a grommet 56. The grommet 56 is received on the stud 48 and a nut 58 threaded on the stud fixedly clamps the grommet to the wall 46 to thereby seal the forward wall 54 of the housing 50 to wall 46 and fixedly secure the rearward end of the strut to rail 14.

The rearward end wall 60 of the housing has a return bent flange which wraps around the central circular opening 62 of the wall 50. A rupturable metal diaphragm 64 fits over the return bent flange of the wall 60. A recess in the end fitting 66, formed as part of a passage 68, receives the diaphragm and return bent flange. The fitting is bolted at 70 to the wall 50 to thereby seal the housing 52 from the passage. The housing 50 is filled through an inlet or port 72 with a suitable gas, such as air or nitrogen, under pressure, such as 2100 psi.

As best shown in FIG. 1, the passage 68 extends within the rail 14 rearwardly of the vehicle and communicates with a conventional inflatable occupant restraint cushion 74 which is conventionally mounted within the passenger compartment of the vehicle. The cushion 74 is shown in inflated position for clarity, although normally it is located in an uninflated position within the instrument panel or other area of the body. Cushions of this type are well known to those skilled in the art and, therefore, it is not believed that any further details are necessary. Although a cushion is shown, it will likewise be understood that other types of inflatable occupant restraints may likewise be communicated with the passages 68. Further, although the passages 68 are shown as directly communicating with the cushion, it will be understood that a suitable diffuser may be located internally of the cushion and communicate with the passages.

With reference now to FIG. 2 of the drawings, a thin cylindrical piercing rod 76 is secured to the stud 48 and projects rearwardly therefrom within the housing 52. The rearward free or terminal end of the rod 76 is spaced a predetermined distance from the rupturable diaphragm 64.

Assuming now that the impact bar 38 impacts a fixed barrier, at a low speed, such as 5 mph, the low level impact forces generated by the impact will be absorbed by the struts 24 as the inner members 26 telescope within the outer members 28 and the fluid medium within the struts is displaced from one side of the piston members to the other through the variable area orifices. The upper limit of the capability or range of energy absorption of the struts may be set as desired to set the range of low level impact forces absorbed thereby. For example, the upper limit may be set at 12,000pounds. Upon cessation of such impact forces, the impact bar 38 will, of course, return to its position shown in FIG. 1 as the members 26 move outwardly of the members 28.

Should the impact speed be higher, such as from 5 to 12 mph with a fixed barrier, the higher level impact forces generated will exceed the range of energy absorption or capability of the struts 20 and the inner members 26 will bottom out with respect to the outer members 28 or engage the walls 30 of the members 28. Since the struts 24 are fixedly secured, the higher level impact forces applied by the impact bar 38 will be applied to the rails 14 when the struts bottom out. The rails 14 will then start to collapse at the beads 20 and 22 to absorb such higher level impact forces through mechanical deformation. The controlled collapse of the frame rails can only absorb such high level impact forces within a predetermined range, such as from 12,000 to 26,000 pounds.

During the controlled collapse of the frame rails 14 due to the higher level impact forces, the struts 24 and the portions of the rails 14 forwardly of the beads 20 and 22 will shift rearwardly relative to the portions of the rails 14 rearwardly of the beads. As this occurs, the rearward or free ends of the piercing rods 76 will engage the central portions of the diaphragms 64 to rupture these diaphragms so that the air, nitrogen, or other gas contained within the housings 52 can flow through the passages 68 to the cushion 74 to inflate the cushion and locate the cushion as shown in FIG. 1. In this position, the cushion is presented for engagement by the occupants of the passenger compartment of the vehicle 10. It should be mentioned here that the diaphragms 64 are of the type having a coined groove surrounding the central portion and extending for approximately 315°. Thus, the central portion separates as a flap from the remainder of the diaphragm when engaged by the piercing rod.

From the foregoing description, it can be seen that the struts or bumper support devices 24 have the capability of absorbing low level impact forces applied to the impact bar 38 and falling within a predetermined first range. Once the impact forces exceed the upper limit of this range, the impact forces are absorbed by mechanical deformation or the controlled collapse of the frame rails 14. At a predetermined force level during such controlled collapse, generally defined by the spacing between the free ends of the piercing rods 76 and the diaphragms 64, the piercing rods engage and rupture the diaphragms so that the pressurized fluid within the housings 52 is released for flow through the passages 68 to the inflatable occupant restraint cushion 74. Thus, the cushion 74 will not be inflated unless the impact forces are in the high level range and exceed a predetermined level within this range as the frame rails 14 collapse.

It can further be seen that there is no need for any sensors, either inertia, velocity or otherwise, to be mounted on the body in order to actuate a fluid pressure source and inflate the cushion. The mechanically deformable portions of the frame rails and the piercing rods 76 function as sensors to release the pressure fluid to the cushion. The barrier equivalent speed at which the pressure fluid is released is set by setting the strength of the beaded portions of the frame rails and the spacing between the piercing rods and the diaphragms. It should also be understood that the beaded portions can be dispensed with and other means provided for initiating controlled collapse of the frame rails at a predetermined force level. The system disclosed herein is mechanical and does not require any external power source. However, the system is limited in that it requires impact engagement of the impact bar 38 with an obstacle before the cushion 70 can be inflated in those instances wherein higher level impact forces are generated by such impact engagement.

Thus this invention provides an improved occupant restraint system.

We claim:

1. The combination comprising, an automotive vehicle having a frame including a controlled mechanically deformable frame portion for absorbing high range impact forces, an impact member, low range energy absorbing means mounting the impact member on the deformable portion of the frame, the frame portion remaining undeformed during absorption of low range impact forces by the energy absorbing means, the energy absorbing means transferring high range impact forces to the deformable portion of the frame to initiate deformation thereof and absorption of such high range forces, a self contained source of pressure fluid within the deformable portion of the frame, an inflatable occupant restraint, mechanically rupturable means normally blocking communication of the source with the restraint, and mechanical rupturing means operable by the low range energy absorbing means during mechanical deformation of the frame portion to rupture the rupturable means and establish communication of the source with the restraint to inflate the restraint.

2. The combination comprising, an automotive vehicle having a frame including a controlled mechanically collapsible frame portion for absorbing high range impact forces, an impact member, low range energy absorbing means mounting the impact member on the collapsible portion of the frame, the frame portion remaining uncollapsed during absorption of low range impact forces by the energy absorbing means, the energy absorbing means transferring high range impact forces to the deformable portion of the frame to initiate collapse thereof and absorption of such high range forces, the low range energy absorbing means moving with the collapsible portion of the frame during mechanical collapse thereof, a source of pressure fluid, an inflatable occupant restraint, mechanically rupturable means normally blocking communication of the source with the restraint, and mechanical rupturing means mounted on the low range energy absorbing means and engageable with the rupturable means to rupture the rupturable means and establish communication of the source with the restraint to inflate the restraint upon mechanical collapse of the frame portion and movement of the low range energy absorbing means therewith.

3. The combination comprising, an automotive vehicle having a frame including a controlled mechanically collapsible linear frame portion for absorbing high range impact forces, an impact member receptive of low range and high range impact forces, low range energy absorbing means mounting the impact member on the linear portion of the frame and absorbing low range impact forces, the linear frame portion remaining uncollapsed during absorption of low range impact forces by the energy absorbing means, the low range energy absorbing means transferring high range impact forces to the linear portion of the frame to initiate mechanical collpase thereof and absorption of such high range forces, a source of pressure fluid, an inflatable occupant restraint, mechanically rupturable means normally blocking communication of the source with the restraint, and rigid rupturing means mounted on the low range energy absorbing means and moved into rupturing engagement with the rupturable means upon mechanical collapse of the frame portion to establish communication of the source with the restraint and inflate the restraint.

4. The combination comprising, an automotive vehicle having a frame including a hollow frame portion having means controlling mechanical collapse thereof for absorbing high range impact forces, an impact member, low range energy absorbing means mounting the impact member on the frame portion, the frame portion remaining uncollapsed during absorption of low range impact forces by the energy absorbing means, the energy absorbing means transferring high range impact forces to the frame portion to initiate collapse thereof and absorption of such high range forces, the low range energy absorbing means moving as a unit with the frame portion during collapse thereof, a self contained source of pressure fluid within the hollow frame portion, an inflatable occupant restraint, mechanically rupturable means normally blocking communication of the source with the restraint, and rigid means mounted on the low range energy absorbing means and projecting within the hollow frame portion for rupturing engagement with the rupturable means to communicate the source with the restraint and inflate the restraint upon collapse of the frame portion and movement of the low range energy absorbing means as a unit therewith.

* * * * *